United States Patent [19]

Ielmini et al.

[11] Patent Number: 5,056,934
[45] Date of Patent: Oct. 15, 1991

[54] TWIST AND TUCK FREEZER BAG

[75] Inventors: Angelo Ielmini, Patterson; Leslie Duck, Turlock; John V. Wylie, Salinas, all of Calif.

[73] Assignee: Del Puerto Marketing Company, Patterson, Calif.

[21] Appl. No.: 644,041

[22] Filed: Jan. 18, 1991

[51] Int. Cl.⁵ .............................................. B65D 3/28
[52] U.S. Cl. ........................................ 383/70; 53/483; 383/89; 383/91
[58] Field of Search ............................ 383/70, 89, 91; 229/125, 39; 53/370, 384, 483

[56] References Cited

U.S. PATENT DOCUMENTS

| | | |
|---|---|---|
| 1,703,620 | 2/1929 | Hamilton . |
| 1,994,945 | 3/1935 | Cook ........................................ 150/3 |
| 2,107,692 | 2/1938 | Botelno ..................................... 150/3 |
| 2,153,310 | 4/1939 | Newman .................................. 383/89 |
| 2,849,171 | 8/1958 | O'Brien, Jr. ............................. 229/63 |
| 3,107,842 | 10/1963 | Guilfoyle .............................. 229/62 |
| 3,149,771 | 9/1964 | Pearl ...................................... 383/89 |
| 3,446,420 | 5/1969 | Rinecker ................................ 383/89 |
| 3,537,636 | 11/1970 | Rochette ............................... 383/89 |
| 4,008,851 | 2/1977 | Hirsch ................................... 229/62 |
| 4,051,994 | 10/1977 | Donk et al. ........................... 383/70 |
| 4,408,643 | 10/1983 | Laske et al. .......................... 383/89 |
| 4,675,910 | 6/1987 | Rangfors ............................... 383/70 |
| 4,753,539 | 6/1988 | Collie et al. .......................... 383/41 |
| 4,854,735 | 8/1989 | Rutledge .............................. 383/72 |
| 4,911,563 | 3/1990 | Ciani .................................... 383/89 |

Primary Examiner—Gary E. Elkins
Attorney, Agent, or Firm—Townsend and Townsend

[57] ABSTRACT

A reusable bag for storing items. The bag has a band located over at least part of the bag's outer surface. The band is detachably secured to the bag with an adhesive. To reseal the bag after opening, the band is partially lifted away from the bag. A space is thus created between the band and the bag into which the twisted end of the bag may be inserted and secured. The band contains adhesive on only a center region of the band to permit the band to be easily separated from the bag and so that user contact with the band does leave adhesive on the user's fingers or wear adhesive from the band.

9 Claims, 4 Drawing Sheets

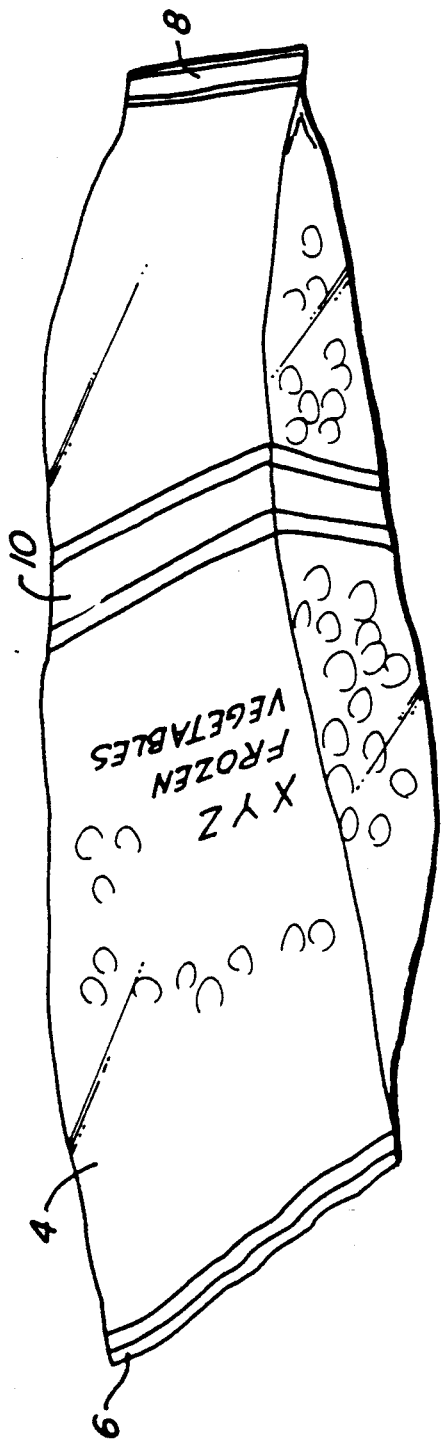
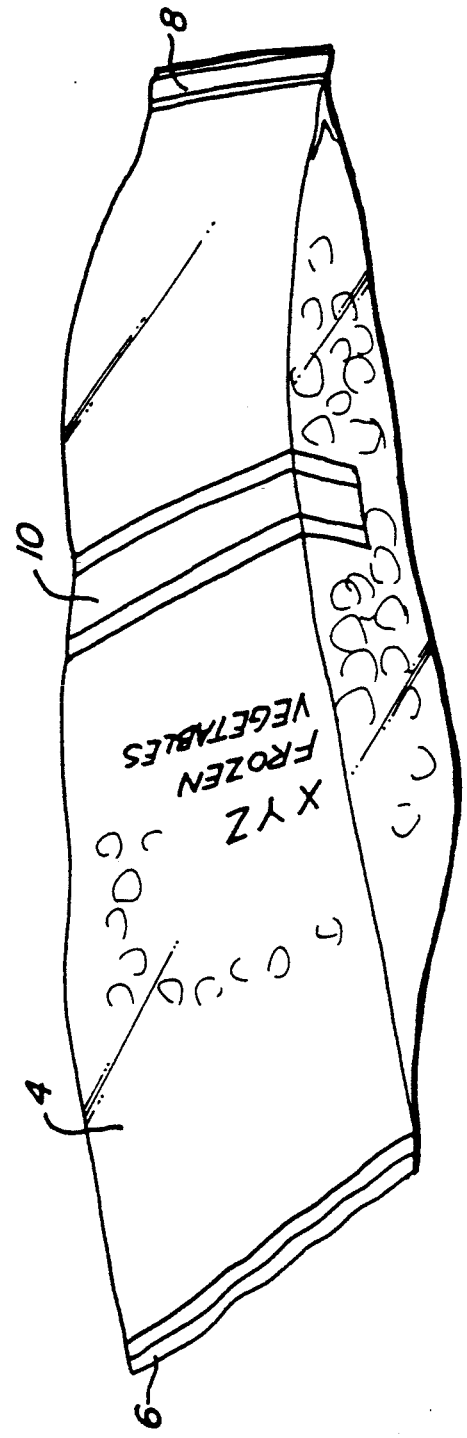

TWIST AND TUCK FREEZER BAG

BACKGROUND OF THE INVENTION

This invention relates to bags, and in particular to resealable freezer storage bags. Various types of resealable bags exist, but these bags have closures which are either difficult and expensive to manufacture or cumbersome to use or have fasteners which are a discrete component and therefore can easily become lost.

For example, one common freezer bag closure consists of a zipper type closure. This type of closure requires special machinery to manufacture the closure and therefore is quite complicated and expensive to produce.

Another common type of freezer bag is described in U.S Pat. No. 2,849,171 to O'Brien. This fastener consists of a plastic or metal tie member which can be adjustably fastened around a twisted end of the bag to reseal the bag after opening. This type of fastener, however, is not integral to the bag structure and can easily be lost. Another type of discrete resealing device is a removable lock tab, such as disclosed in U.S. Pat. No. 4,753,539 to Collie et al.

Other types of resealable bags having integral closures are cumbersome to use. One example is the resealable bag described in U.S. Pat. No. 4,008,851 to Hirsch. The Hirsch bag contains a strip of adhesive material which is fixably attached at one end to the bag and removably attached along the remaining portions of the strip. To close the bag, the removable portion of the strip is removed from the bag. The bag is then twisted in the region near the adhesive strip and the twisted bag end is then fastened by looping the free end of the adhesive strip around the twisted portion and resecuring the strip to the bag.

Such a closure system is cumbersome to use for several reasons. First, the adhesive strip contains adhesive along the detachable portion. This detachable portion is frequently handled by the bag user, whose hands/fingers may become sticky from contact with the adhesive strip. In addition, the user's frequent contact with the strip may contaminate or remove significant amounts of the adhesive such that the closure can no longer effectively function. Second, the bag can only be effectively resealed in the region of the adhesive strip. If only a portion of the bag contents located above the strip are removed, the bag cannot be effectively sealed by this closure since the bag cannot be twisted in the region of the strip due to the remaining bag contents. Therefore, the strip is normally located in a region close to the top portion of the bag. However, as the bag contents dwindle, a larger volume of air will be trapped between the seal and the remaining contents. This volume of air reduces the freshness of remaining items stored in the bag.

SUMMARY OF THE INVENTION

The present invention provides an inexpensive, resealable freezer bag with integral closure that is easy to use. According to one embodiment of the invention, a band containing an adhesive material is located a given distance from the bottom of the bag. The band at least partially encircles the bag. The bag may be resealed after opening by gathering and twisting the open end and lifting a portion of the band away from the outer surface of the bag, thereby creating a space between the bag and the band. The twisted open end can be folded and reinserted in this space and secured in this position with the band adhesive. This system allows the bag to be effectively resealed for the entire range of bag volumes without trapping a significant volume of air in the resealed bag. The bag of the present invention thus ensures content freshness.

According to another embodiment of the present invention, the band contains an adhesive strip only along a center portion and at least one outside edge of the band remains free of adhesive. This structure permits the user to grasp and lift the band without contacting the adhesive. Contact with the adhesive which could make manipulation of the band cumbersome and leave adhesive on the user's fingers is thereby avoided. Alternatively, the band could include one or more lifting tabs to aid separation of the band from the bag.

BRIEF DESCRIPTION OF THE DRAWINGS

FIG. 1 depicts a bag with resealable closure according to an embodiment of the present invention;

FIG. 1A depicts a bag with resealable closure according to an alternate embodiment of the present invention;

DESCRIPTION OF THE PREFERRED EMBODIMENT

Figure 2A:
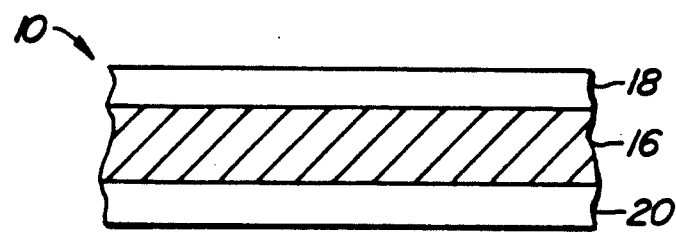
FIG. 2A depicts an adhesive band suitable for use in an embodiment of the present invention.

FIG. 1 depicts an unopened freezer bag 4 containing, for example, frozen vegetables. Bag 4 is manufactured from polyethylene, but may be manufactured from a variety of flexible materials suitable for use with the given bag contents and application. Unopened bag 4 is sealed at ends 6 and 8 using a heat seal. Alternatively, a variety of seals known to those of skill in the art may be used to initially seal bag 4.

At a given distance from end 8 of bag 4, a band 10, used to reseal bag 4 once opened, spans the outer perimeter of the bag. The distance from end 8 to band 10 is typically one-half to one-third of the unopened bag length. Band 10 may span the entire perimeter of bag 4 as shown in FIG. 1, or only a portion thereof, for example as shown in FIG. 1A. Band 10 is approximately ½ inch, or 1.27 cm wide.

Band 10 contains an adhesive material 16 (See FIG. 2) on a portion of the band's underside surface adjacent to bag 4 which secures band 10 to bag 4 and also secures the portion of bag 4 to be resealed. The underside of band 10 also contains a nonadhesive region. Adhesive region 16 secures band 10 to the bag material without slipping. The nonadhesive region allows the user to grasp band 10 without contacting the band adhesive.

Contact with the band adhesive may leave adhesive on the user's fingers and wear adhesive from the band, ultimately rendering the adhesive ineffective. Furthermore, contact with the adhesive would make manipulation of the band by the user cumbersome and difficult.

Figure 2B:
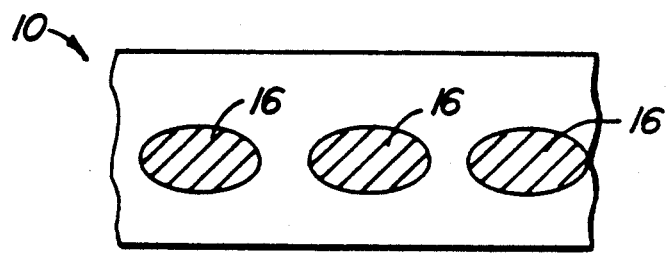
FIG. 2B depicts an alternative adhesive band suitable for use in the present invention.

FIGS. 2A-2E depict a variety of structures suitable for constructing the underside surface of band 10. In FIG. 2A, the underside surface of band 10 contains adhesive strip 16 down the center. Non-adhesive regions 18 and 20 are located to each side of adhesive strip 16. Another possible band 10 structure is depicted in FIG. 2B. In this structure, the adhesive material is located in an oval pattern down the center of the strip. Both structures shown in FIGS. 2A and 2B may be fabricated by directly applying the adhesive material to the band material.

Figure 2C:
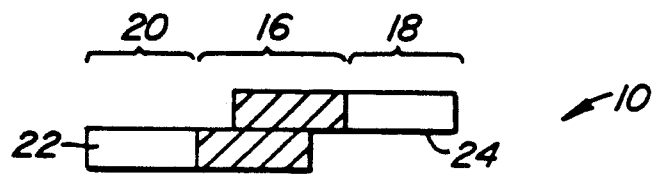
FIG. 2C shows an end view of an adhesive band shown in FIG. 2A.
Figure 2D:
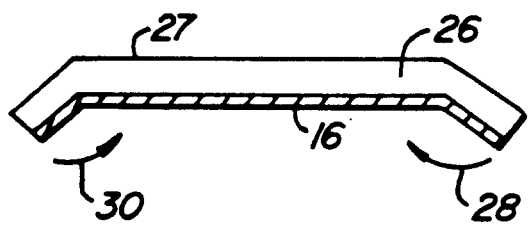
FIG. 2D shows an end view of a structure from which the adhesive band of FIG. 2A may be formed.
Figure 2E:
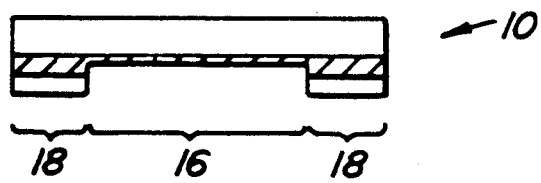
FIG. 2E shows an end view of an adhesive band made for the structure of FIG. 2D.

Alternatively, the structure of band 10 shown in FIG. 2A may be constructed by a variety of techniques. For example, FIG. 2C shows an end view of the band 10 structure pictured in FIG. 2A. In FIG. 2C, two pieces of band material 22 and 24 each contain adhesive 16 on an outer edge of the band material. Pieces 22 and 24 are overlaid on each other in the manner shown to create a center strip of adhesive 16 surrounded by nonadhesive regions 18 and 20 on each side. FIG. 2D also shows an end view of material from which the band structure of FIG. 2A may be formed. In FIG. 2D, the structure of FIG. 2A is created by taking a piece of band material 26 which has adhesive 16 located on one entire surface and no adhesive located on surface 27. The ends of material 26 are folded over in the directions of arrows 28 and 30 to create nonadhesive regions 18 and 20 as seen in FIG. 2E. Using the band fabrication methods depicted in FIGS. 2C and 2D, commonly available cellophane tapes may be used without the need for purchasing or manufacturing special types of tapes.

A cellophane tape manufactured by the 3M Company of Minneapolis, Minn., under the trademark Scotch Brand, proves suitable for use with the polyethylene material commonly used to fabricate bag 4. Other types of adhesive tapes known to those of skill in the art may be used so long as the adhesive is sufficient to prevent band 10 from slipping on the outer surface of bag 4 and also facilitates lifting of band 10 from bag 4.

Figure 3A:
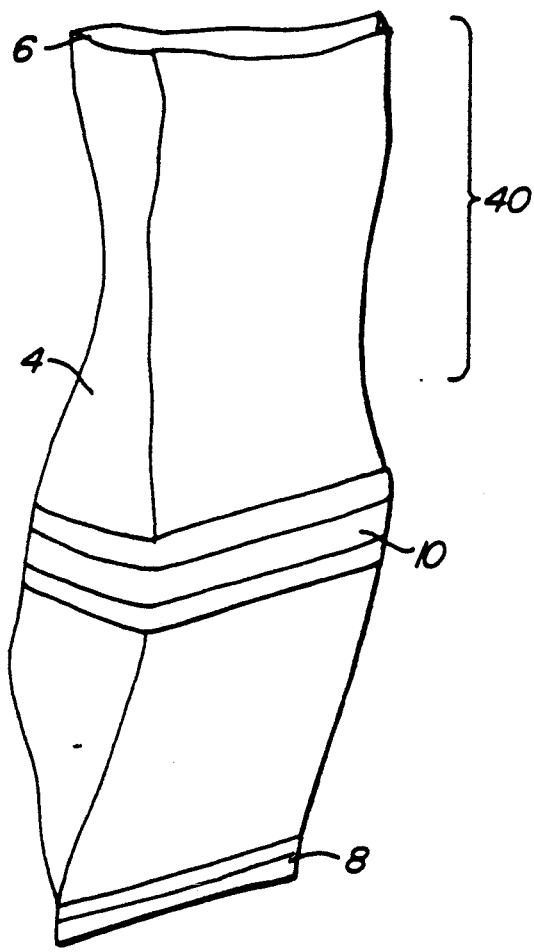
FIG. 3A depicts the bag of FIG. 1 in a opened condition.
Figure 3B:
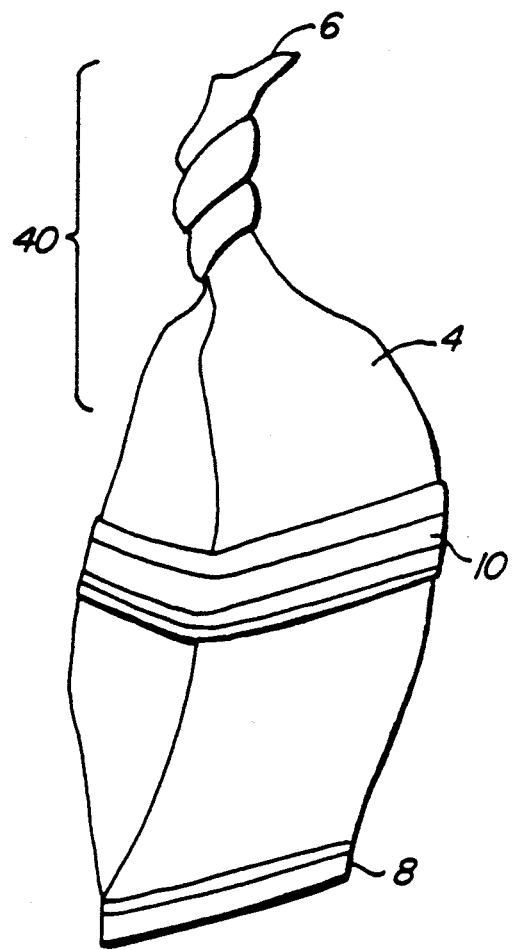
FIG. 3B shows the bag of FIG. 3A with the top gathered and twisted.
Figure 3C:
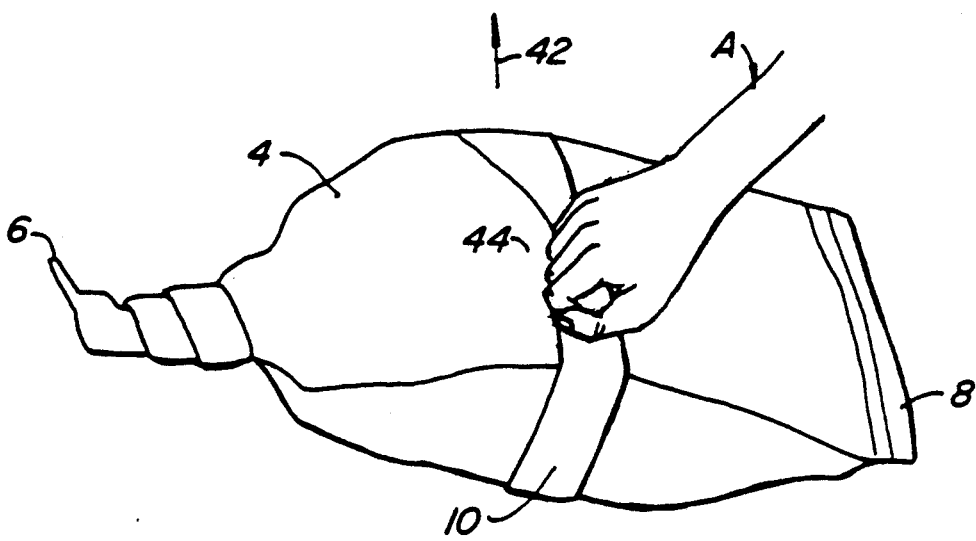
FIG. 3C depicts the partial detachment of adhesive band from the bag of FIG. 3B.
Figure 3D:
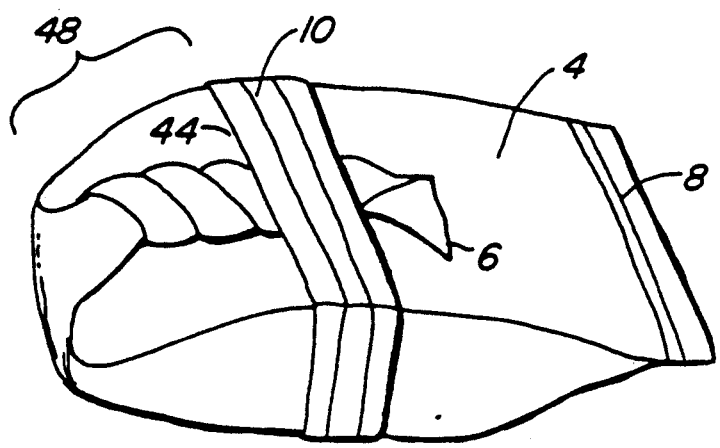
FIG. 3D shows the bag of FIG. 3C with the twisted top tucked under the adhesive band to reseal the bag.

FIG. 3A shows bag 4 after a portion 40 of the contents have been removed. To reseal bag 4, portion 40 from which bag contents have been removed is first gathered and twisted as shown in FIG. 3B. In FIG. 3C, the user A then grabs band 10 and lifts band 10 up and away from the outer surface of bag 4 in the direction of arrow 42 thereby forming space 44 between band 10 and the surface of bag 4. Since band 10 contains adhesive on only a portion of its underside, user A does not contact any of the adhesive on his hand or fingers. This feature improves user convenience and increases the durability of band 10. Next, as shown in FIG. 3D, user A folds the twisted portion of bag 4 and tucks this twisted portion under band 10 in space 44. The user can then gently press down on band 10 to secure the position of twisted portion in space 44 with adhesive 16 of band 10. The resealed bag is as shown in FIG. 3D.

As may be seen from the figure, a portion 48 of bag 4 can still contain material. Band 10 therefore need not be located adjacent to the portion of the bag from which the contents have been removed. The bag is thus resealable over the range of quantities which can be removed from the bag. Furthermore, no sizeable volume of air is trapped between the twisted end of the bag and the remaining bag contents. The remaining contents are thus stored in a manner that ensures continued freshness.

The preferred embodiments of the present invention have now been described. Variations and modifications will now be apparent to those of skill in the art. For example, adhesive 16 need not be located on the band itself but can be located on bag 4 at the location where bag 4 contacts band 10. For these reasons, the invention should be construed in light of the claims.

What is claimed is:

1. A recloseable container comprising:
    a bag formed of flexible material having an outer surface, a first end, a second end and length therebetween;
    a band spanning at least a portion of the length of said bag and located at a given distance from said second end;
    said band having an underside surface adjacent an outer surface region of said bag;
    at least one of said underside surface and outer surface region having adhesive and nonadhesive regions;
    wherein said first end may be tucked between said band and said bag at said adhesive region to reclose the bag.

2. The recloseable container of claim 1 wherein said band comprises:
    a first nonadhesive strip located along a first outer edge of said band and running parallel to a length of said band;
    a second nonadhesive strip located along a second outer edge of said band and running parallel to said first band; and
    an adhesive strip located between and parallel to said first and second nonadhesive strips.

3. The recloseable container of claim 1 wherein said band comprises:
    a plurality of discrete adhesive areas located in a center region of said band and wherein each one of said discrete adhesive regions is separated by a nonadhesive region.

4. The recloseable container of claim 1 wherein said bag is formed of polyethylene.

5. The recloseable container of claim 1 wherein said band is formed from cellophane tape.

6. The recloseable bag of claim 1 wherein said adhesive region is located on the outer surface region of said bag and said band does not contain an adhesive region.

7. A method for closing a bag formed of flexible material comprising the steps of:
    gathering an open end of said bag to form a gathered end;
    folding said gathered end towards a closed end of said bag;
    tucking the gathered end between an adhesive region formed between a band and the outer surface of the bag, the band encircling at least a portion of the outer surface of the bag;
    adhesively securing the gathered end between the band and the outer surface of the bag.

8. A recloseable container comprising:
    a bag formed of flexible material having an outer surface, a first end, a second end and length therebetween;
    a band having an underside surface adjacent an outer surface adjacent an outer surface region of said bag, and spanning at least a portion of the length of said bag;

wherein said band has a non-adhesive strip located along an outer edge of the underside surface of said band and running parallel to a length of said band;

wherein said band has an adhesive region adjacent said non-adhesive strip; and wherein said first end may be tucked between said band and said bag to reclose the bag.

9. The container of claim 8 wherein said band is formed of cellophane tape.

* * * * *